US006358308B2

(12) United States Patent
Jung et al.

(10) Patent No.: US 6,358,308 B2
(45) Date of Patent: Mar. 19, 2002

(54) FINISHING TREATMENT OF PIGMENTS IN LIQUID OR SUPERCRITICAL $CO_2$

(75) Inventors: Rüdiger Jung, Kelkheim; Klaus Kund, Langenscheid; Bernd Nestler; Martin U. Schmidt, both of Frankfurt am Main; Leonhard Unverdorben, Nidderau; Rudolf Steiner, Erlangen, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/733,145

(22) Filed: Dec. 8, 2000

(30) Foreign Application Priority Data

Dec. 10, 1999 (DE) .......................................... 199 59 661

(51) Int. Cl.[7] .............................................. C09B 67/36
(52) U.S. Cl. ....................... 106/493; 106/496; 106/497; 106/498; 106/412
(58) Field of Search ................................ 106/493, 496, 106/497, 498, 412

(56) References Cited

U.S. PATENT DOCUMENTS

| 4,368,582 A | | 1/1983 | Graser et al. ................... 34/15 |
| 5,122,291 A | * | 6/1992 | Wolff et al. .................... 252/62 |
| 5,264,212 A | * | 11/1993 | Mohri et al. .............. 424/195.1 |
| 5,399,597 A | * | 3/1995 | Mandel et al. ............... 523/342 |
| 5,548,004 A | * | 8/1996 | Mandel et al. ............... 523/342 |

FOREIGN PATENT DOCUMENTS

EP  0 036 520  9/1981

OTHER PUBLICATIONS

Derwent Patent Abstract No. 2001–192147, abstract of Chinese Patent Specification No. 1273970 (Nov. 2000).*
PCT Search Report (Feb. 20, 2001).

* cited by examiner

Primary Examiner—Anthony Green
(74) Attorney, Agent, or Firm—Susan S. Jackson; Scott E. Hanf

(57) ABSTRACT

The invention provides a process for aftertreating organic pigments by causing the ground or unground crude organic pigment and liquid or supercritical carbon dioxide to act on one another.

8 Claims, No Drawings

FINISHING TREATMENT OF PIGMENTS IN LIQUID OR SUPERCRITICAL $CO_2$

BACKGROUND OF THE INVENTION

The present invention is in the field of organic color pigments. It is known that organic pigments, especially azo pigments, are precipitated from the synthesis solution as small insoluble particles (primary crystallites) which require an aftertreatment (finish). In the course of this treatment, it is necessary to modify physical properties, such as crystal form, crystal size and crystal quality, and also particle size distribution, toward a desired optimum. If a crude pigment presscake is in fact dried directly after synthesis and washing, there is often considerable congregation of the primary particles to form agglomerates and aggregates. This leads to pigments with hard grains, weak in color and difficult to disperse, which are often impossible to bring into a technically usable form, even by milling. Polycyclic pigments are precipitated from the synthesis solution usually as coarsely crystalline crude pigments, which need to be subsequently finely divided by means of appropriate techniques, such as milling, for example. In the majority of cases, the prepigments thus obtained also require an aftertreatment in order to obtain the desired physical properties.

The standard pigment finish is a thermal aftertreatment in which improved crystal formation is achieved by heating the crude pigment suspension or the pigment presscake, washed to remove salts, isolated and pasted up again, in water and/or organic solvents. In this process, the ultrafine fraction, which is responsible in particular for the agglomeration tendency of the pigments, is reduced and, consequently, a narrower particle size distribution is obtained. In organic solvents, pigments of particularly low solubility are aftertreated at temperatures of from 80 to 150° C. Solvents used for this purpose include, for example, alcohols, glacial acetic acid, chlorobenzene, o-dichlorobenzene, and dimethylformamide. The finishing techniques which have been customary to date are expensive in terms of apparatus and energy, since heating and the distillative removal of the solvent are often conducted under pressure. Since the majority of organic solvents are flammable, appropriate measures must be taken for plant safety.

SUMMARY OF THE INVENTION

The object of the present invention was to provide an appropriate finishing process for organic pigments which is superior to the hitherto customary solvent finish in terms of safety, environmental compatibility, and resource consumption.

It has been found that liquid or supercritical carbon dioxide is, surprisingly, a suitable finishing medium for organic pigments.

DESCRIPTION OF THE PREFERRED EMBODIMENTS

The present invention accordingly provides a process for aftertreating organic pigments, which comprises causing ground or unground arrange crude organic pigment and liquid or supercritical carbon dioxide to act on one another.

The procedure here is judiciously to filter the crude pigment suspension which is present following pigment synthesis or following a fine division, e.g., by grinding, to wash the solid filter product, to dry the washed product to give the crude pigment powder, and to add liquid or supercritical $CO_2$. Instead of the dried crude pigment powder it is also possible to use a water-moist or solvent-moist crude pigment, e.g., a filter cake or presscake.

The aftertreatment of the invention is judiciously conducted in a heatable autoclave with stirring apparatus. It is not necessary to pump off the residual air still present in the autoclave. Carbon dioxide may be added in the form of dry ice or by pumping in gaseous or liquid $CO_2$, the amount being calculated such that the pressure which is established at the desired temperature is a pressure at which $CO_2$ is in the supercritical or liquid state. The preferred temperature range is situated between 31.2° C. and 250° C., with particular preference between 50 and 200° C., in particular between 80 and 180° C., for supercritical $CO_2$. The pressure which is established is from 73.8 bar to preferably 400 bar, with particular preference between 75 and 300 bar, in particular between 80 and 250 bar. For liquid $CO_2$, the preferred temperature range is from 10 to 31.2° C., in particular from 20 to 31° C. Relative to the weight of the crude pigment, the $CO_2$ is used judiciously in an amount ($CO_2$: pigment) of from (0.2:1) to (200:1), preferably from (0.5:1) to (10:1).

The duration of the aftertreatment may vary within wide limits, with from 10 minutes to 10 hours being judicious and from 0.5 to 5 hours being preferred. Subsequently, the autoclave is let down to atmospheric pressure and emptied.

It may be advantageous to conduct the aftertreatment of the invention in the presence of water or organic solvents, such as hydrocarbons, alcohols, ethers, amines, carboxylic acids, carboxylic esters or carboxamides, for example, such as N-methylpyrrolidone, for example. In this case, the amount of water or solvent added should preferably be at most that which is soluble in carbon dioxide under the prevailing conditions. Thus, for example, at 75° C. and 200 bar, about 5 g of water are soluble per kilogram of $CO_2$.

The aftertreatment of the invention may be performed with all organic color pigments, such as azo pigments and polycyclic pigments. Azo pigments may be monoazo, disazo, disazocondensation, naphthol, or metal complex pigments.

Particularly appropriate azo pigments are C.I. Pigment Yellow 16, 32, 83, 97, 120, 151, 154, 155, 175, 180, 181, 191, 194, 213, Pigment Orange 34, 36, 38, 62, 72, 74, Pigment Red 53:2, 112, 122, 137, 144, 170, 171, 175, 176, 185, 187, 188, 208, 214, 242, 247, 253; Pigment Violet 32; Pigment Brown 25.

Polycyclic pigments may be, for example, isoindolinone, isoindoline, anthanthrone, thioindigo, quinophthalone, anthraquinone, dioxazine, phthalocyanine, quinacridone, perylene, perinone, diketopyrrolopyrrole, thiazoindigo and azomethine pigments, especially Pigment Violet 19, 23, Pigment Blue 15, Pigment Green 7, 36, 37, Pigment Red 122, Pigment Yellow 139.

It has been found that the aftertreatment of the invention may replace the aqueous or solvent finish which has been customary to date. Furthermore, with certain pigments, depending on temperature, pressure, treatment period and addition of water, there may surprisingly also be a change in other physical properties, such as the crystal modification or the ratio of the crystal modifications formed, for example.

For example, the aftertreatment of the invention starting from crude α-phase P.R. 170 produces a finished P.R. 170 having a γ-phase fraction.

EXAMPLES

In the examples below, the coloristic properties of the pigment samples obtained were determined by comparative measurements in the alkyd-melamine baking varnish AM 5; the untreated samples were used in each case as the reference. The brightening was evaluated by colorimetry in the CIELAB system in accordance with DIN 6174; measurement was carried out on a PCM instrument from Gardner, with the mean being formed in each case from three individual values. The masstone was evaluated visually under an assessment lamp in accordance with ASTM D1729 using daylight (CIE D65).

Example 1 (comparative example)

A suspension of 90 g of P.R. 170 (α phase) in 1.7 l of water was admixed with 480 ml of isobutanol and the mixture was stirred in an autoclave at a temperature of 140° C. for 1 hour. After the autoclave had been cooled and let down, its contents were transferred to a distillation apparatus and the solvent was separated off by steam distillation. The aqueous pigment suspension obtained was filtered, the filter cake was washed with 8 l of water, and the washed product was dried in a drying oven at 100° C. for 15 hours. This gives P.R. 170 in the β phase.

Examples 2 to 7
$CO_2$ Finish 100 g of crude Pigment Red 170 (powder, α phase) were charged to a 1.7 l autoclave. After heating to 139° C., a pressure of 83 bar was established by pumping in carbon dioxide. After the contents of the autoclave had heated up and the set conditions were constant, the pigment was maintained under these conditions for 1 hour, 4 hours or 5 hours. Following a 10-minute cooling phase, the autoclave was let down and the pigment was removed.

The finishing conditions were varied in accordance with the table below:

removed: the ratio of the γ phase to the β phase is about 7:3. The product is meaningfully stronger in color, noticeably bluer and substantially cleaner than the reference.

The α phase of P.R. 170 is understood as that crystal modification which is characterized by the following lines in the X-ray powder diagram (Cu $K_α$ radiation, 2Θ values in degrees): 7.6 (strong), 25.7 (strong), 5.2, 8.2, 11.7, 13.5, 15.9, 18.9, 23.5 (all moderately strong).

The β phase of P.R. 170 is understood as that crystal modification which is characterized by the following lines in the X-ray powder diagram: 25.5 (strong), 7.1, 8.2, 11.3, 12.8, 15.1, 17.9 (all weak).

The γ phase is distinguished by the following lines: 25.7 (strong), 7.3, 11.3, 12.9, 15.4, 18.2 (all moderately strong).

All line positions of all modifications of all pigments are subject to an inaccuracy of ±0.2°.

Example 11

The procedure of example 10 is repeated but using P.R.53:2 (powder, α phase) instead of P.Red 170. A mixture of α- and γ phase is obtained in a ratio of approximately 1:1, which is characterized by the following lines in the X-ray powder diagram: 4.4, 5.0, 5.7 (all strong), 25.0, 25.8 (both moderately strong), 6.6, 8.7, 9.7, 10.1, 13.8, 14.5, 15.3, 16.7, 17.7, 18.0, 18.5, 23.2, 26.5 (all weak).

The product formed is somewhat redder than the initial pigment.

Examples 12 to 15

100 g of powder of the following crude pigments were charged to a 1.7 l autoclave. After heating to 140° C., a pressure of 240 bar was established by pumping in carbon dioxide and the pigment was held under these conditions for 4 hours. Subsequently, the autoclave was let down and the finished pigment removed:

| Ex. No. | Finishing conditions | | | | Crystal phase | Colorimetrics | | |
|---|---|---|---|---|---|---|---|---|
| | t [h] | T [° C.] | p [bar] | | Main/secondary | CS | dH | dC |
| | — | — | — | untreated | α | Reference | | |
| 2 | 1 | 139 | 83 | | γ high proportion α and β | a) | f) | h) |
| 3 | 1 | 140 | 238 | | γ high proportion α and β | b) | f) | i) |
| 4 | 4 | 138 | 80 | | γ fairly large fractions α and β | b) | e) | i) |
| 5 | 4 | 139 | 238 | | γ approx. 30% β, distinct fractions α | b) | f) | i) |
| 6 | 5 | 150 | 240 | 1 h 139° C., 4 h 150° C. | γ approx. 30% β, distinct fractions α | b) | d) | g) |
| 7 | 4 | 173 | 240 | | γ approx. 20% β | c) | d) | j) |
| 8 | 4 | 42 | 80 | | α | a) | d) | h) |
| 9 | 4 | 27 | 70 | liquid $CO_2$ | α | a) | d) | g) | a) noticeably stronger in color
b) markedly stronger in color
c) significantly stronger in color
d) somewhat yellower
e) noticeably bluer
f) substantially bluer
g) a trace cleaner
h) noticeably cleaner
i) markedly cleaner
j) significantly cleaner Example 10
$CO_2$ Finish with Addition of Water 100 g of crude P. Red 170 (powder, α phase) were charged to an autoclave. Prior to the addition of carbon dioxide, 3 g of water in addition were introduced into the autoclave. The system was heated to 139° C., a pressure of 240 bar was established by pumping in $CO_2$, and the pigment was stirred under these conditions for 4 hours. After cooling, the finished pigment was 12) C.I. Pigment Yellow 151

13) C.I. Pigment Yellow 180

14) C.I Pigment Yellow 83

15) C.I. Pigment Orange 36

In all cases, a soft-grained pigment featuring good performance properties was obtained.

Example 16

Polycyclic Pigment 100 g of powder of the C.I. Pigment Red 122 (crude pigment) were charged to a 1.7 l autoclave. After heating to 140° C., a pressure of 240 bar was established by pumping in carbon dioxide and the pigment was held under these conditions for 4 hours. Subsequently, the autoclave was let down and the finished pigment removed. A soft-grained pigment featuring good performance properties was obtained.

Example 17

Polycyclic Pigment with Water 100 g of powder of the C.I. Pigment Violet 23 (crude pigment) and 20 g of water were charged to a 1.7 l autoclave. After heating to 125° C., a pressure of 240 bar was established by pumping in carbon dioxide and the pigment was held under these conditions for 4 hours. Subsequently, the autoclave was let down and the finished pigment removed. A soft-grained pigment featuring good performance properties was obtained.

Example 18

Finish with Addition of NMP (N-methylpyrrolidin-2-one)

100 g of reddish brown crude pigment P.Y. 213 and 4.9 g of NMP were charged to a 1.7 l autoclave. After heating to 160° C., a pressure of 243 bar was etsablished by pumping in $CO_2$ and the pigment was stirred under these conditions for 4 hours. After letdown, the finished pigment was removed. In comparison to the reddish brown colored initial pigment which was difficult to disperse in the AM 5 varnish, the product obtained is yellow, readily dispersible and suitable, for example, for producing metallic paints.

What is claimed is:

1. A process for finishing organic pigments which comprises treating a ground or unground crude organic pigment in the form of a dry powder with liquid or supercritical carbon dioxide ($CO_2$), wherein the pigment is an azo pigment or a polycyclic pigment.

2. The process as claimed in claim 1, wherein the finishing is conducted with supercritical $CO_2$ at a temperature between 31.2° C. and 250° C. and a pressure between 73.8 bar and 400 bar.

3. The process as claimed in claim 1, wherein the finishing is conducted with supercritical $CO_2$ at a temperature between 50 and 200° C. and a pressure between 75 and 300 bar.

4. The process as claimed in claim 1, wherein the finishing is conducted with liquid $CO_2$ at a temperature between 10° C. and 31.2° C.

5. The process as claimed in claim 1, wherein $CO_2$ is employed in a weight ratio $CO_2$ to pigment of between 0.2:1 and 200:1.

6. The process as claimed in claim 1, wherein the finishing is carried out from 10 minutes to 10 hours.

7. The process as claimed in claim 1, wherein the finishing is conducted in the presence of water or organic solvent.

8. The process as claimed in claim 7, wherein the amount of water or organic solvent added is at most the amount which dissolves in the liquid or supercritical carbon dioxide.

* * * * *